(12) United States Patent
Shurtleff

(10) Patent No.: US 7,393,369 B2
(45) Date of Patent: Jul. 1, 2008

(54) APPARATUS, SYSTEM, AND METHOD FOR GENERATING HYDROGEN

(75) Inventor: James Kevin Shurtleff, Orem, UT (US)

(73) Assignee: Trulite, Inc., Orem, UT (US)

( * ) Notice: Subject to any disclaimer, the term of this patent is extended or adjusted under 35 U.S.C. 154(b) by 339 days.

(21) Appl. No.: 10/459,991

(22) Filed: Jun. 11, 2003

(65) Prior Publication Data

US 2003/0228252 A1    Dec. 11, 2003

Related U.S. Application Data

(60) Provisional application No. 60/387,817, filed on Jun. 11, 2002.

(51) Int. Cl.
*B01J 7/00* (2006.01)
*H01M 8/06* (2006.01)

(52) U.S. Cl. ............... 48/61; 48/204; 422/239; 429/19; 429/17

(58) Field of Classification Search ......... 422/239; 48/61, 204; 429/17, 19
See application file for complete search history.

(56) References Cited

U.S. PATENT DOCUMENTS

| | | | |
|---|---|---|---|
| 2,542,746 A | 2/1951 | Banus et al. | 423/288 |
| 3,133,837 A | 5/1964 | Eidensohn | |
| 3,313,598 A | 4/1967 | Gluckstein | |
| 3,449,078 A | 6/1969 | Quik et al. | 23/212 |
| 3,511,710 A | 5/1970 | Jung et al. | 136/86 |
| 3,649,360 A | 3/1972 | Bloomfield et al. | 136/86 |
| 3,734,863 A | 5/1973 | Beckert et al. | 252/188 |
| 3,940,474 A | 2/1976 | Huskins | |
| 3,977,990 A | 8/1976 | Beckert et al. | 252/188.3 |
| 4,000,003 A | 12/1976 | Baker et al. | 429/7 |
| 4,155,712 A * | 5/1979 | Taschek | 422/239 |
| 4,261,955 A | 4/1981 | Bailey, Jr. et al. | 422/239 |
| 4,261,956 A | 4/1981 | Adlhart | |
| 4,433,633 A | 2/1984 | Caudy et al. | 114/54 |
| 4,436,793 A | 3/1984 | Adlhart | 429/17 |
| 4,463,066 A | 7/1984 | Adlhart et al. | 429/34 |

(Continued)

FOREIGN PATENT DOCUMENTS

EP    1 514 839    *    3/2005

(Continued)

OTHER PUBLICATIONS

Messina-Boyer, Chris. "Millennium Cell Receives Patent on System for Hydrogen Generation," Millennium Cell, Inc., Eatontown, NEWS, Mar. 18, 2003.

(Continued)

*Primary Examiner*—N. Bhat
(74) *Attorney, Agent, or Firm*—Kunzler & McKenzie

(57) ABSTRACT

An apparatus, system, and method generate hydrogen through a controlled chemical reaction between water and a chemical hydride. The invention includes a chemical hydride isolated from water by a water-selective membrane. A fluid containing water is brought into contact with the water-selective membrane. The water diffuses through the water-selective membrane and reacts with the chemical hydride. The water diffuses through the membrane at a predetermined rate based on a water concentration gradient across the water-selective membrane. The water-selective membrane is substantially impermeable to elements and molecules other than water. Hydrogen generated within the chemical hydride is collected and used in various applications.

15 Claims, 5 Drawing Sheets

U.S. PATENT DOCUMENTS

| | | | |
|---|---|---|---|
| 4,463,068 A | 7/1984 | Cohn et al. ............... 429/34 |
| 4,486,276 A | 12/1984 | Cohn et al. ............... 204/98 |
| 4,513,065 A | 4/1985 | Adlhart ............... 429/19 |
| 4,543,246 A | 9/1985 | Houser |
| 4,628,010 A | 12/1986 | Iwanciow ............... 429/19 |
| 4,740,504 A | 4/1988 | Hall et al. ............... 514/64 |
| 4,782,096 A | 11/1988 | Banquy |
| 4,962,462 A | 10/1990 | Fekete |
| 4,968,393 A | 11/1990 | Mazur |
| 4,973,530 A | 11/1990 | Vanderborgh |
| 4,978,451 A * | 12/1990 | Taylor ............... 210/500.27 |
| 4,988,583 A | 1/1991 | Watkins |
| 5,047,301 A | 9/1991 | Adlhart et al. ............... 429/101 |
| 5,108,849 A | 4/1992 | Watkins et al. |
| 5,200,278 A | 4/1993 | Watkins et al. |
| 5,205,841 A | 4/1993 | Vaiman ............... 55/16 |
| 5,229,222 A | 7/1993 | Tsutsumi et al. ............... 429/19 |
| 5,264,299 A | 11/1993 | Krasij |
| 5,292,600 A | 3/1994 | Kaufman |
| 5,314,762 A | 5/1994 | Hamada et al. ............... 429/37 |
| 5,366,820 A | 11/1994 | Tsutsumi et al. ............... 429/19 |
| 5,372,617 A | 12/1994 | Kerrebrock |
| 5,382,478 A | 1/1995 | Chow |
| 5,514,353 A * | 5/1996 | Adlhart ............... 422/239 |
| 5,557,188 A | 9/1996 | Piercey ............... 320/5 |
| 5,593,640 A | 1/1997 | Long et al. ............... 422/111 |
| 5,599,640 A | 2/1997 | Lee et al. ............... 429/46 |
| 5,634,341 A | 6/1997 | Klanchar |
| 5,683,828 A | 11/1997 | Spear et al. ............... 429/13 |
| 5,688,611 A * | 11/1997 | Golben ............... 429/53 |
| 5,702,491 A | 12/1997 | Long et al. ............... 48/197 |
| 5,728,464 A * | 3/1998 | Checketts ............... 428/403 |
| 5,804,329 A | 9/1998 | Amendola ............... 429/34 |
| 5,833,934 A * | 11/1998 | Adlhart ............... 422/239 |
| 5,843,297 A * | 12/1998 | Schmid et al. ............... 205/687 |
| 5,858,587 A | 1/1999 | Yamane et al. ............... 430/22 |
| 5,863,671 A | 1/1999 | Spear |
| 5,932,365 A | 8/1999 | Lin et al. ............... 429/12 |
| 5,948,558 A | 9/1999 | Amendola ............... 429/50 |
| 5,955,039 A | 9/1999 | Dowdy |
| 5,962,155 A | 10/1999 | Kuranaka et al. ............... 429/20 |
| 5,976,725 A | 11/1999 | Gamo et al. ............... 429/25 |
| 5,996,976 A | 12/1999 | Murphy |
| 6,051,128 A | 4/2000 | Nacamuli |
| 6,066,409 A | 5/2000 | Ronne |
| 6,090,312 A | 7/2000 | Ziaka |
| 6,096,286 A | 8/2000 | Autenrieth |
| 6,097,175 A | 8/2000 | Yoon ............... 320/132 |
| 6,106,965 A * | 8/2000 | Hirano et al. ............... 429/30 |
| 6,106,968 A | 8/2000 | Johnson et al. ............... 429/50 |
| 6,108,968 A | 8/2000 | Peng ............... 47/24 |
| 6,110,611 A | 8/2000 | Stuhler et al. ............... 429/13 |
| 6,156,450 A | 12/2000 | Bailey ............... 429/93 |
| 6,198,253 B1 | 3/2001 | Kurle et al. ............... 320/132 |
| 6,231,825 B1 | 5/2001 | Colby et al. ............... 423/286 |
| 6,236,326 B1 | 5/2001 | Murphy ............... 340/636 |
| 6,238,814 B1 | 5/2001 | Horiguchi et al. ............... 429/12 |
| 6,250,078 B1 | 6/2001 | Amendola et al. ............... 60/509 |
| 6,268,077 B1 | 7/2001 | Kelley et al. ............... 429/33 |
| 6,274,093 B1 | 8/2001 | Long et al. ............... 422/129 |
| 6,312,848 B1 | 11/2001 | Kilb et al. ............... 429/162 |
| 6,337,120 B1 | 1/2002 | Sasaki et al. |
| 6,387,228 B1 | 5/2002 | Maget |
| 6,387,557 B1 | 5/2002 | Krasij |
| 6,399,234 B2 | 6/2002 | Bonk |
| 6,428,918 B1 | 8/2002 | Fuglevand et al. |
| 6,433,129 B1 | 8/2002 | Amendola et al. ............... 528/271 |
| 6,468,682 B1 | 10/2002 | Fuglevand |
| 6,468,694 B1 | 10/2002 | Amendola ............... 429/218.1 |
| 6,483,274 B2 | 11/2002 | Lee ............... 320/132 |
| 6,495,278 B1 | 12/2002 | Schmid |
| 6,497,973 B1 | 12/2002 | Amendola ............... 429/19 |
| 6,497,974 B2 | 12/2002 | Fuglevand |
| 6,500,577 B2 | 12/2002 | Foster |
| 6,503,649 B1 | 1/2003 | Czajkowski |
| 6,524,542 B2 | 2/2003 | Amendola et al. ............... 423/286 |
| 6,531,630 B2 | 3/2003 | Vidalin |
| 6,533,827 B1 | 3/2003 | Cisar |
| 6,534,033 B1 | 3/2003 | Amendola |
| 6,541,147 B1 | 4/2003 | McLean |
| 6,544,400 B2 | 4/2003 | Hockaday |
| 6,544,679 B1 | 4/2003 | Petillo et al. ............... 429/34 |
| 6,554,400 B1 | 4/2003 | Aoki ............... 347/47 |
| 6,576,350 B2 * | 6/2003 | Buxbaum ............... 428/670 |
| 6,586,563 B1 | 7/2003 | Ortega et al. ............... 528/394 |
| 6,599,653 B1 | 7/2003 | Cummins |
| 6,602,631 B1 | 8/2003 | Cisar |
| 6,607,857 B2 | 8/2003 | Blunk |
| 6,645,651 B2 * | 11/2003 | Hockaday et al. ............... 429/19 |
| 6,649,097 B2 | 11/2003 | Sasaki |
| 6,653,003 B1 | 11/2003 | Tsai |
| 6,670,444 B2 | 12/2003 | Amendola et al. ............... 528/394 |
| 6,683,025 B2 | 1/2004 | Amendola |
| 6,685,570 B2 | 2/2004 | Zilberman |
| 6,688,106 B2 | 2/2004 | Okusawa |
| 6,703,722 B2 | 3/2004 | Christensen |
| 6,706,909 B1 | 3/2004 | Snover et al. ............... 558/296 |
| 6,733,916 B2 | 5/2004 | Mizuno |
| 6,743,542 B2 | 6/2004 | Krasij |
| 6,745,801 B1 | 6/2004 | Cohen |
| 6,746,496 B1 | 6/2004 | Kravitz |
| 6,755,219 B1 | 6/2004 | Bolle |
| 6,764,786 B2 | 7/2004 | Morrow |
| 6,770,186 B2 | 8/2004 | Rosenfeld |
| 6,777,127 B2 | 8/2004 | Einhart |
| 6,787,008 B2 * | 9/2004 | Joshi et al. ............... 204/252 |
| 6,794,418 B2 | 9/2004 | Sogge |
| 6,805,987 B2 | 10/2004 | Bai |
| 6,811,764 B2 | 11/2004 | Jorgensen |
| 6,811,906 B2 | 11/2004 | Bai |
| 6,811,918 B2 | 11/2004 | Blunk |
| 6,815,110 B2 | 11/2004 | Marsh ............... 429/30 |
| 6,818,334 B2 | 11/2004 | Tsang |
| 6,821,499 B2 | 11/2004 | Jorgensen |
| 6,827,747 B2 | 12/2004 | Blunk |
| 6,899,967 B2 * | 5/2005 | Johnson ............... 429/19 |
| 6,901,302 B2 | 5/2005 | Kami ............... 700/90 |
| 6,904,533 B2 | 6/2005 | Kuo et al. ............... 713/322 |
| 6,932,847 B2 | 8/2005 | Amendola et al. ............... 48/76 |
| 6,939,529 B2 | 9/2005 | Strizki et al. ............... 423/658.2 |
| 7,019,105 B2 | 3/2006 | Amendola et al. ............... 528/271 |
| 7,052,671 B2 | 5/2006 | McClaine et al. ............... 423/658.2 |
| 7,074,509 B2 | 7/2006 | Rosenfield ............... 429/19 |
| 7,083,657 B2 | 8/2006 | Mohring et al. ............... 48/61 |
| 7,105,033 B2 | 9/2006 | Strizki et al. ............... 48/61 |
| 7,108,777 B2 | 9/2006 | Xu et al. ............... 205/408 |
| 7,166,269 B2 | 1/2007 | Tanaka et al. |
| 2001/0025289 A1 | 9/2001 | Jenkins et al. ............... 704/141 |
| 2001/0045364 A1 * | 11/2001 | Hockaday et al. ............... 205/338 |
| 2001/0046616 A1 | 11/2001 | Mossmann |
| 2002/0022162 A1 | 2/2002 | Kagitani ............... 429/17 |
| 2002/0022168 A1 | 2/2002 | Faris et al. ............... 429/27 |
| 2002/0022170 A1 | 2/2002 | Franklin et al. ............... 429/34 |
| 2002/0045075 A1 | 4/2002 | Pinto et al. ............... 429/15 |
| 2002/0045082 A1 | 4/2002 | Marsh ............... 429/30 |
| 2002/0058168 A1 | 5/2002 | Voss |
| 2002/0076598 A1 | 6/2002 | Bostaph et al. ............... 429/38 |
| 2002/0083643 A1 | 7/2002 | Amendola et al. ............... 48/61 |
| 2002/0106541 A1 | 8/2002 | Yamada |
| 2002/0106550 A1 | 8/2002 | Nishiki |
| 2002/0150804 A1 | 10/2002 | Srinivasan |
| 2002/0165417 A1 | 11/2002 | Numaguchi |
| 2002/0166286 A1 | 11/2002 | McClaine |
| 2002/0171021 A1 | 11/2002 | Fuglevand |

| | | |
|---|---|---|
| 2002/0177015 A1 | 11/2002 | Fuglevand |
| 2002/0177018 A1 | 11/2002 | Fuglevand |
| 2002/0177042 A1 | 11/2002 | Amendola ............... 429/218.1 |
| 2002/0182470 A1 | 12/2002 | Agizy |
| 2003/0003038 A1 | 1/2003 | Amendola et al. .......... 423/286 |
| 2003/0008187 A1 | 1/2003 | Higashiyama et al. ........ 429/19 |
| 2003/0008194 A1 | 1/2003 | Cargneli |
| 2003/0009942 A1 | 1/2003 | Amendola et al. ............. 48/61 |
| 2003/0012999 A1 | 1/2003 | Yoshioka et al. ............... 429/34 |
| 2003/0037487 A1 | 2/2003 | Amendola |
| 2003/0051785 A1 | 3/2003 | Gauthier |
| 2003/0091882 A1 | 5/2003 | Schmidt |
| 2003/0092877 A1 | 5/2003 | Amendola et al. .......... 528/394 |
| 2003/0098258 A1 | 5/2003 | Gregory |
| 2003/0111908 A1 | 6/2003 | Christensen |
| 2003/0113259 A1 | 6/2003 | Rusta-Sallehy |
| 2003/0114632 A1 | 6/2003 | Ortega et al. ................. 528/196 |
| 2003/0162059 A1 | 8/2003 | Gelsey |
| 2003/0180603 A1 | 9/2003 | Richards |
| 2003/0194596 A1 | 10/2003 | Ye |
| 2003/0204993 A1 | 11/2003 | Holland |
| 2003/0219371 A1 | 11/2003 | Amendola ................... 423/351 |
| 2003/0219641 A1 | 11/2003 | Petillo .......................... 429/38 |
| 2003/0226763 A1 | 12/2003 | Narayanan |
| 2003/0228252 A1 | 12/2003 | Shurtleff |
| 2003/0228505 A1 | 12/2003 | Tsang |
| 2003/0232225 A1 | 12/2003 | Maruyama |
| 2003/0235749 A1 | 12/2003 | Haltiner |
| 2004/0005488 A1 | 1/2004 | Faris et al. ..................... 429/23 |
| 2004/0009379 A1 | 1/2004 | Amendola et al. ............. 429/17 |
| 2004/0009392 A1 | 1/2004 | Petillo et al. ................. 429/122 |
| 2004/0011662 A1 | 1/2004 | Xu et al. ...................... 205/408 |
| 2004/0025808 A1* | 2/2004 | Cheng ............................. 123/3 |
| 2004/0031695 A1 | 2/2004 | Oloman |
| 2004/0033194 A1 | 2/2004 | Amendola |
| 2004/0035054 A1 | 2/2004 | Mohring |
| 2004/0043274 A1 | 3/2004 | Scartozzi |
| 2004/0047801 A1 | 3/2004 | Petillo |
| 2004/0052723 A1 | 3/2004 | Jorgensen |
| 2004/0053100 A1 | 3/2004 | Stanley |
| 2004/0065865 A1 | 4/2004 | Desgardin |
| 2004/0067195 A1 | 4/2004 | Strizki et al. .............. 423/658.2 |
| 2004/0072041 A1 | 4/2004 | Koschany |
| 2004/0081884 A1 | 4/2004 | Bean et al. ..................... 429/98 |
| 2004/0109374 A1 | 6/2004 | Sundar |
| 2004/0115493 A1 | 6/2004 | Kim |
| 2004/0120889 A1 | 6/2004 | Shah |
| 2004/0121196 A1 | 6/2004 | Liu |
| 2004/0148857 A1 | 8/2004 | Strizki et al. ............... 48/127.9 |
| 2004/0160216 A1 | 8/2004 | Speranza |
| 2004/0161646 A1 | 8/2004 | Rezachek |
| 2004/0161652 A1 | 8/2004 | Ovshinsky |
| 2004/0166057 A1 | 8/2004 | Schell |
| 2004/0180247 A1 | 9/2004 | Higashiyama et al. ........ 429/19 |
| 2004/0180253 A1 | 9/2004 | Fisher |
| 2004/0191152 A1 | 9/2004 | Amendola et al. .......... 423/288 |
| 2004/0191588 A1* | 9/2004 | Eshraghi et al. ............... 429/19 |
| 2004/0200903 A1 | 10/2004 | deVos |
| 2004/0214056 A1 | 10/2004 | Gore |
| 2004/0214057 A1 | 10/2004 | Fuglevand |
| 2004/0219398 A1 | 11/2004 | Calhoon ....................... 429/13 |
| 2004/0219399 A1 | 11/2004 | Zhu |
| 2004/0253496 A1 | 12/2004 | Foster |
| 2005/0013771 A1 | 1/2005 | Amendola ............... 423/658.2 |
| 2005/0014044 A1 | 1/2005 | Thirukkovalur |
| 2005/0016840 A1 | 1/2005 | Petillo ......................... 204/248 |
| 2005/0017216 A1 | 1/2005 | Poetsch et al. .......... 252/299.61 |
| 2005/0017646 A1 | 1/2005 | Boulos et al. ............ 315/111.41 |
| 2005/0038267 A1 | 2/2005 | Poetsch et al. ............... 549/294 |
| 2005/0058595 A1 | 3/2005 | Shi et al. ..................... 423/657 |
| 2005/0124016 A1 | 6/2005 | LaDu et al. ................. 435/7.92 |
| 2005/0132640 A1 | 6/2005 | Kelly et al. .................... 44/301 |
| 2005/0135996 A1 | 6/2005 | Ortega et al. .............. 423/648.1 |
| 2005/0162122 A1 | 7/2005 | Dunn et al. .................. 320/101 |
| 2005/0233184 A1 | 10/2005 | Dunn et al. .................... 429/12 |
| 2005/0238573 A1 | 10/2005 | Zhang et al. .............. 423/648.1 |
| 2005/0268555 A1 | 12/2005 | Amendola et al. ............. 48/61 |
| 2005/0271905 A1 | 12/2005 | Dunn et al. .................... 429/11 |
| 2005/0276746 A1 | 12/2005 | Zhang et al. ................ 423/651 |
| 2006/0021279 A1 | 2/2006 | Mohring et al. ................ 48/61 |
| 2006/0058527 A1 | 3/2006 | Kirsch et al. ................. 544/333 |
| 2006/0102489 A1 | 5/2006 | Kelly .......................... 205/357 |
| 2006/0102491 A1 | 5/2006 | Kelly et al. .................. 205/407 |
| 2006/0144701 A1 | 7/2006 | Kelly .......................... 204/267 |
| 2006/0169593 A1 | 8/2006 | Xu et al. ...................... 205/406 |
| 2006/0196112 A1 | 9/2006 | Berry et al. .................... 44/550 |
| 2006/0210841 A1 | 9/2006 | Wallace et al. ................ 429/12 |
| 2006/0225350 A1 | 10/2006 | Spallone et al. ............ 48/198.2 |
| 2006/0236606 A1 | 10/2006 | Strizki et al. ............... 48/127.9 |
| 2006/0269470 A1 | 11/2006 | Zhang et al. .............. 423/648.1 |
| 2006/0292067 A1 | 12/2006 | Zhang et al. .............. 423/648.1 |
| 2006/0293173 A1 | 12/2006 | Zhang et al. ................ 502/182 |
| 2007/0011251 A1 | 1/2007 | McNamara et al. ......... 709/206 |
| 2007/0020510 A1 | 1/2007 | Dunn et al. .................... 429/65 |

FOREIGN PATENT DOCUMENTS

JP        54-121292        9/1979

OTHER PUBLICATIONS

"A Novel High Power Density Borohydride-Air Cell," Amendola S.C. et al., Journal of Power Sources, vol. 84, No. 1, Nov. 1999, pp. 130-133(4).

"Enabling Fuel Cells for Standby Power-Chemical Hydride Fueling Technology," Smith, G.M., et al. Millennium Cell Inc., Eatontown, Telecommunications Energy Conference, 2004, Sep. 19-23, 2004.

"Recent Advances in Hydrogen Storage in Metal-Containing Inorgainc Nanostructures and Related Materials," Seayad, A.M., et al. Copyright 2004 May 19, 2004.

"Hydrogn Generation Via Sodium Borohydride," Mohring, R.M., et al. Millennium Cell, Inc., Eatontown, AIP Conference Proceedings—Jul. 11, 2003—vol. 671, Issue 1, pp. 90-100.

"Solid Storage," Luzader, R., Millennium Cell, Inc., Eatontown, News, Jun./Jul. 2003.

"Will Fuel Cells Replace Batteries in Mobile Devices?" Paulson, L.D. Millennium Cell, Inc.' Eatontown, News, Nov. 2003.

"Fuel Chemistry News" Newsletter of the ACS Division of Fuel Chemistry, vol. 82, No. 2, Fall 2003.

"VI.B.4 DOE Chemical Hydrogen Storage Center of Excellence" Tumas, W. et al., FY 2005 Progress Report.

"Review of Chemical Processes for the Synthesis of Sodium Borohydride" Wo, Y. et al., Millennium Cell Inc., Aug. 2004.

"A safe, portable, hydrogen gas generator using aqueous borohydride solution and Ru catalyst" Amendola, S.C. et al., International Journal of Hydrogen Energy 25 (2000) 969-975.

Schlesinger et al. "Sodium Borohydride, Its Hydrolysis and its Use as a Reducing Agent and in the Generation of Hydrogen," Mar. 15, 1952.

Aiello et al. "Production of Hydrogen from Chemical Hydrides Via Hydrolysis with Steam," International Journal of Hydrogen Energy vol. 24 (1999) pp. 1123-1130.

Aiello et al. "Production of Hydrogen Gas From Novel Chemical Hydrides," International Journal of Hydrogen Energy vol. 23 (1998) pp. 1103-1108.

* cited by examiner

APPARATUS, SYSTEM, AND METHOD FOR GENERATING HYDROGEN

This application claims benefit of provisonal application 60/387,817 filed Jun. 11, 2002.

BACKGROUND OF THE INVENTION

1. The Field of the Invention

The invention relates to apparatus, systems, and methods for generating hydrogen from a chemical hydride. Specifically, the invention relates to apparatus, systems, and methods for generating hydrogen by a self-regulated chemical reaction between water and a chemical hydride.

2. The Relevant Art

Various energy sources are used to fuel today's society. Fossil fuels such as coal, oil, and gas are some of the most commonly used fuels due to the comparatively large quantities available and minimal expense required to locate, collect, and refine the fossil fuels into usable energy sources. Alternative energy sources are available. Some of the alternative energy sources are readily available; however, the cost to generate, collect, or refine the alternative energy sources traditionally outweighs the benefits gained from the alternative energy sources.

Hydrogen is a plentiful alternative energy source; however, hydrogen generally exists as a molecule combined with one or more other elements. The additional elements add mass and may prevent the hydrogen from being a usable energy source. As a result, pure hydrogen is desired for use as an energy source. Pure hydrogen comprises free hydrogen atoms or molecules comprising only hydrogen atoms. Producing pure hydrogen using conventional methods requires expensive, bulky, and heavy storage containers.

In the prior art, pure hydrogen is generated by a chemical reaction which produces either free hydrogen atoms or hydrogen molecules. One such chemical reaction occurs between water, $H_2O$, and chemical hydrides. Chemical hydrides are molecules comprising hydrogen and one or more alkali or alkali-earth metals. Examples of chemical hydrides include lithium hydride (LiH), lithium tetrahydridoaluminate ($LiAlH_4$), lithium tetrahydridoborate ($LiBH_4$), sodium hydride (NaH), sodium tetrahydridoaluminate ($NaAlH_4$), sodium tetrahydridoborate ($NaBH_4$), and the like. The chemical hydrides produce large quantities of pure hydrogen when reacted with water, as shown in reaction 1.

$$LiAlH_4(s) + 2H_2O(g,l) \rightarrow LiAlO_2(s) + 4H_2(g) \quad (1)$$

Recently, the interest in hydrogen generation from chemical hydrides has increased, due to the development of lightweight, compact Proton Exchange Membrane (PEM) fuel cells. One by-product of the PEM fuel cells is water that can be used to produce pure hydrogen from chemical hydrides for fuelling the PEM fuel cell. The combination of PEM fuel cells with a chemical hydride hydrogen generator offers advantages over other energy storage devices in terms of gravimetric and volumetric energy density, as shown in Table 1.

TABLE 1

Density Comparison for Various Energy Storage Devices producing 220 W for 12 hrs

| Energy Source | Conversion Type | Conv. Eff. | Required Energy (W-h) | Source Specific Energy (W-h/kg) | Fuel Wt (Kg) | System Wt (kg) | Total Wt. (kg) | Total Specific Energy (W-h/kg) |
|---|---|---|---|---|---|---|---|---|
| $LiBH_4$ (water recycling) | PEMFC | 50% | 5,280 | 12,300 | 0.43 | 2.93 | 3.36 | 785 |
| LiH (water recycling) | PEMFC | 50% | 5,280 | 8,500 | 0.62 | 3.09 | 3.71 | 712 |
| $LiAlH_4$ (water recycling) | PEMFC | 50% | 5,280 | 7,100 | 0.74 | 3.19 | 3.93 | 672 |
| NaH (water recycling) | PEMFC | 50% | 5,280 | 2,800 | 1.89 | 4.09 | 5.98 | 441 |
| Gasoline | Reformer/PEMFC | 30% | 8,800 | 12,300 | 0.72 | 5.46 | 6.18 | 427 |
| Diesel | Reformer/PEMFC | 30% | 8,800 | 9,900 | 0.89 | 5.53 | 6.42 | 411 |
| Propane | Reformer/PEMFC | 30% | 8,800 | 12,900 | 0.68 | 6.00 | 6.68 | 395 |
| Natural Gas | Reformer/PEMFC | 30% | 8,800 | 11,900 | 0.74 | 6.06 | 6.80 | 388 |
| Gasoline | ICE | 15% | 17,600 | 12,300 | 1.43 | 5.46 | 6.89 | 383 |
| NaBH4 (20% hydride/water solution) | PEMFC | 50% | 5,280 | 1,420 | 3.72 | 4.07 | 7.79 | 339 |
| Zinc-Air Refuelable Battery | Direct | 60% | 4,400 | 400 | 11.00 | 0.00 | 11.00 | 240 |
| Methanol (25% methanol/water solution) | DMFC | 30% | 8,800 | 1,375 | 6.40 | 5.15 | 11.55 | 229 |
| Magnesium Hydride | PEMFC | 50% | 5,280 | 1,200 | 4.40 | 11.39 | 15.79 | 167 |
| Compressed Hydrogen (4.5 KPSI) | PEMFC | 50% | 5,280 | 33,300 | 0.16 | 23.60 | 23.76 | 113 |
| Li-ion Battery (rechargeable) | Direct | 90% | 2,933 | 120 | 24.44 | 0.00 | 24.44 | 108 |
| NiMH Battery (rechargeable) | Direct | 90% | 2,933 | 70 | 41.90 | 0.00 | 41.90 | 63 |

TABLE 1-continued

Density Comparison for Various Energy Storage Devices producing 220 W for 12 hrs

| Energy Source | Conversion Type | Conv. Eff. | Required Energy (W-h) | Source Specific Energy (W-h/kg) | Fuel Wt (Kg) | System Wt (kg) | Total Wt. (kg) | Total Specific Energy (W-h/kg) |
|---|---|---|---|---|---|---|---|---|
| Lead Acid Battery (rechargeable) | Direct | 90% | 2,933 | 40 | 73.33 | 0.00 | 73.33 | 36 |

Notes:
1) PEMFC weight based on 85 W/kg. Reformer weight equals PEMFC weight. ICE weight based on 45 W/kg. H2 cylinder weight based on 130 kg tank/kg fuel. Methane/Propane cylinder weight based on 1.2 kg tank/kg fuel. Tank weight for other liquid sources based on 0.4 kg tank/kg fuel. Tank weight for other solid sources based on 0.8 kg tank/kg fuel.
2) The energy densities of the chemical hydrides were calculated assuming that water produced in the PEMFC is recycled to react with the chemical hydride.
3) The energy densities of all other sources are generally accepted values from the literature.
4) The DMFC was assumed to be 30% efficient. The PEMFC was assumed to be 50% efficient. The hydrogen reformer was assumed to be 60% efficient. A small ICE was assumed to be 15% efficient. 90% of the energy in the battery was assumed to be recoverable.

Unfortunately, the prior art has encountered unresolved problems producing pure hydrogen from chemical water/hydride reactions. Specifically, conventional systems, methods, and apparatus have not successfully controlled the chemical reaction between the water and the chemical hydride without adversely affecting the gravimetric and volumetric energy density of the overall system.

The chemical reaction between water and chemical hydrides is very severe and highly exothermic. The combination of the water and the chemical hydride must be precisely controlled to prevent a runaway reaction or an explosion. Many attempts have been made to properly control the reaction while still preserving the gravimetric and volumetric energy density provided by the chemical hydrides.

For example, the chemical hydride may be mixed with a stable, non-reactive organic liquid that allows the chemical hydride to be safely stored until it is needed. To produce hydrogen at a desired rate the chemical hydride/organic liquid mixture is brought in contact with a catalyst. In another example, a nonflammable solution of 20% $NaBH_4$, 75% water and 5% NaOH, produces hydrogen when brought in contact with a catalyst. While these examples may successfully control the water/chemical hydride reaction, the stabilizing materials and catalysts are non-reactive materials that add weight and do not store energy. Consequently, the energy density of the storage device is reduced.

In another prior art approach, impermeable polyethylene balls encapsulate a chemical hydride. The ping-pong ball size spheres are stored in water until hydrogen is required, at which point a special cutting system slices the ball in half, exposing the chemical hydride to the water. Unfortunately, this approach includes many moving mechanical parts that are subject to malfunction, increase the weight of the system, and increase the cost of the hydrogen generator.

Finally, certain prior art techniques separate water from the chemical hydride using a membrane. Generally, the membranes pass water because of a difference in water pressure across the membrane. Water pressure on the side of the membrane opposite the chemical hydride pushes the water through the membrane. Other membranes utilize capillary action to transport water from one side of the membrane to the other. Consequently, a water supply must be provided that supplies water to the water side of the membrane to be transported by capillary action to the chemical hydride side of the membrane.

Unfortunately, prior art attempts to control the chemical reaction of water and chemical hydrides using membranes have limitations. Specifically, the membranes require that a water supply be constantly maintained such that sufficient water and/or water pressure is available on the water side of the membrane. As a result, the water supply increases the overall weight and complexity of the system.

Furthermore, in order for the membranes to properly function, the water must be in a liquid form. The liquid water increases the weight of the system and limits the environments in which the conventional hydrogen generator may be operated, because the water must stay at a temperature between the freezing and boiling points of the water. In addition, the membranes generally have pores that allow the water to pass. These pores may also allow hydrogen to pass back through the membrane toward the water side of the membrane which complicates the collection of the hydrogen.

Accordingly, what is needed is an improved apparatus, system, and method that overcomes the problems and disadvantages of the prior art. The apparatus, system, and method should not include a catalyst or stabilizing material to control the chemical water/hydride reaction. In particular, the apparatus, system, and method should control a chemical reaction between water and a chemical hydride using a membrane without relying on a water pressure differential across the membrane. The membrane should allow substantially only water to pass. In addition, the apparatus, system, and method should control a chemical reaction between water and a chemical hydride using a membrane that functions whether the water is in a liquid state or a gaseous state. Furthermore, the apparatus, system, and method should be compact, lightweight, simple, and maximize the gravimetric and volumetric energy density of the chemical hydride. Such an apparatus, system, and method are disclosed herein.

SUMMARY OF THE INVENTION

The various elements of the present invention have been developed in response to the present state of the art, and in particular, in response to the problems and needs in the art that have not yet been fully solved by currently available hydrogen generators. Accordingly, the present invention provides an improved apparatus, system, and method for generating hydrogen.

In one embodiment of the present invention, a hydrogen generator for generating hydrogen from a chemical hydride includes a chemical hydride disposed within a water-selective membrane. The water-selective membrane is nonporous and allows substantially only water to diffuse through the membrane according to a concentration gradient. Preferably, the water-selective membrane is substantially impermeable to hydrogen, nitrogen, oxygen, and metallic oxides.

The water-selective membrane diffuses water from a fluid to the interior of the water-selective membrane. Preferably, the fluid includes water in a gas state, a water vapor. Of course, the fluid may include water in a liquid state. The water is diffused through the water-selective membrane at a very constant and controlled rate. The water on the inside of the water-selective membrane reacts with the chemical hydride to produce hydrogen.

The water-selective membrane includes an outlet port configured to allow hydrogen with the water-selective membrane to exit. In one aspect, a collection conduit connected to the outlet port and extending into the chemical hydride transports hydrogen to the outlet port. The hydrogen may be collected by attaching conventional conduits and storage devices to the outlet port. In certain embodiments, the outlet port includes a check valve configured to only allow gas to exit the water-selective membrane through the outlet port. The outlet port may also include a filter configured to retain a chemical hydride and a metallic oxide within the water-selective membrane.

In one configuration, chemical hydride is disposed within a housing. A check valve connected to the housing in fluid communication with the chemical hydride allows hydrogen to exit the housing. A water-selective membrane separates the chemical hydride from a fluid comprising water. The water-selective membrane selectively diffuses water from the fluid across the water-selective membrane and into chemical hydride to react with the chemical hydride to produce hydrogen. Preferably, the rate of diffusion of water through the water-selective membrane is determined by a water concentration gradient across the water-selective membrane.

In another aspect of the present invention, a method for generating hydrogen through a controlled chemical reaction between water and a chemical hydride is provided. The method includes providing a chemical hydride including, but not limited to, lithium hydride (LiH), lithium tetrahydridoaluminate ($LiAlH_4$), lithium tetrahydridoborate ($LiBH_4$), sodium hydride (NaH), sodium tetrahydridoaluminate ($NaAlH_4$), and sodium tetrahydridoborate ($NaBH_4$).

The chemical hydride is isolated from water by a water-selective membrane having an internal surface and an external surface. A fluid comprising water is introduced to the external surface of the water-selective membrane. The water-selective membrane selectively diffuses water in the fluid through the water-selective membrane at a constant rate to chemically react with the chemical hydride.

The method may further include collecting hydrogen produced by the chemical reaction between the water and the chemical hydride. In addition, the method may include transporting the collected hydrogen to a hydrogen storage module using a collection conduit.

The various elements and aspects of the present invention provide an improved apparatus, system, and method for generating hydrogen through a self-regulated chemical reaction between water and a chemical hydride. The rate of combining water with the chemical hydride is controlled by a diffusion gradient of water across a water-selective membrane. The present invention does not require a catalyst or a stabilizing substance. Consequently, the present invention maximizes the gravimetric and volumetric energy density available from the chemical hydride. The present invention allows substantially only water to pass through a membrane and react with a chemical hydride. The water may be in a liquid state or a gas state. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages of the invention will be readily understood, a more particular description of the invention will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of material, structures, mechanical components, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
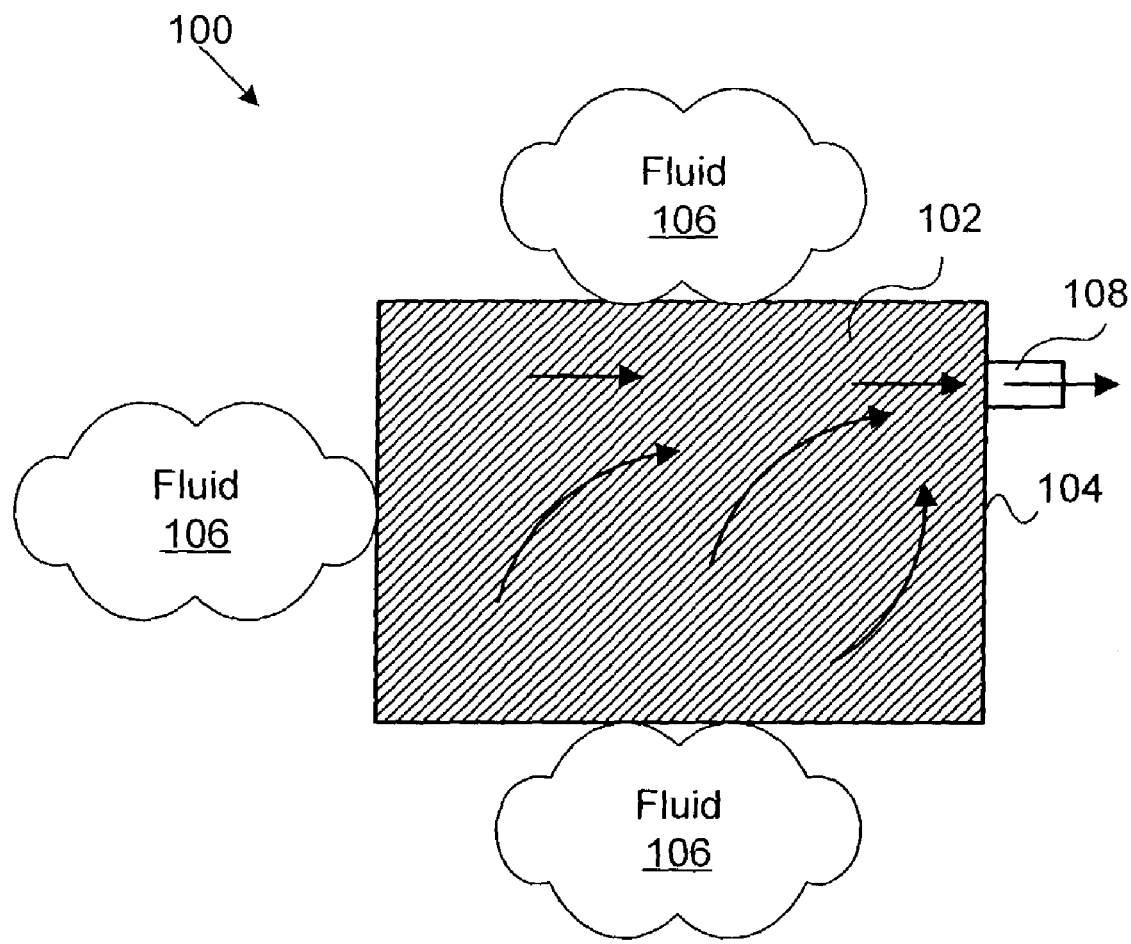
FIG. 1 is a block diagram illustrating a one embodiment of the present invention.

Referring now to FIG. 1, a hydrogen generator 100 for generating hydrogen by a self-regulated chemical reaction between water and a chemical hydride is illustrated. The hydrogen generator 100 includes a chemical hydride 102 disposed within a water-selective membrane 104. As mentioned above, a chemical hydride 102 is a molecule comprising hydrogen and one or more alkali or alkali-earth metals. Examples of chemical hydrides 102 include lithium hydride (LiH), lithium tetrahydridoaluminate ($LiAlH_4$), lithium tetrahydridoborate ($LiBH_4$), sodium hydride (NaH), sodium tetrahydridoaluminate ($NaAlH_4$), sodium tetrahydridoborate ($NaBH_4$), and the like. The chemical hydrides 102 produce large quantities of pure hydrogen when reacted with water, as shown above in reaction 1.

In selected embodiments, the water-selective membrane 104 is designed specifically to allow substantially only water molecules to pass through the membrane. The water-selective membrane 104 is in one embodiment a thin, pliable, nonporous, translucent plastic. The plastic may be a durable synthetic polymer with a high tensile strength (about 23 to 32 MPa) that is capable of maintaining its structural integrity in temperatures up to about 190 degrees C.

In certain embodiments, the water-selective membrane 104 is formed into sheets or tubes. As illustrated in FIG. 1, sheets of the water-selective membrane 104 may be heat welded together to form a container for a chemical hydride 102. The size and shape of the container may be determined by the quantity of chemical hydride 102 and the desired application for the hydrogen generator 100.

The water-selective membrane 104 may comprise a variety of materials. Preferably, the materials are polymers. One representative example of a material suitable for use as a water-selective membrane 104 in the present invention is Nafion® available from E. I. DuPont of Wilmington, Del. Specifically, the water-selective membrane 104 is a perfluorosulfonic acid/PTFE (polytetrafluoroethylene) copolymer in the acid ($H^+$) form.

Preferably, the water-selective membrane 104 is highly selective and permeable to water. The water-selective membrane 104 is an ionomer that is highly ion-conductive and includes sulfonic acid groups. The sulfonic acid groups in the polymer chains that comprise the water-selective membrane 104 attract water molecules. The water molecules are passed along one or more cross-linked polymer chains of the water-selective membrane 104 and exit the water-selective membrane 104 on the opposite side.

The water-selective membrane 104 transports water through the membrane by diffusion. The diffusion of water through the membrane is naturally controlled by a water concentration gradient across the water-selective membrane 104. The concentration gradient ensures that water is diffused at a constant rate.

The thermodynamic driving force acting on the water is the difference in the water's chemical potential across the water-selective membrane 104. The flux of water through a membrane can be calculated as follows:

$$dM/dt = P*\Delta c/d \qquad (2)$$

where dM/dt is the mass flux, P is the permeability coefficient of the membrane for water, $\Delta c$ is the concentration gradient, and d is the thickness of the membrane.

Equation 2 illustrates that the water flux is affected by the thickness of the membrane. The concentration gradient, $\Delta c$, of water across the water-selective membrane 104 is substantially 100%, because any water that diffuses through the water-selective membrane 104 will immediately react with the chemical hydride 102. The membrane permeability (P) is affected by several factors including the type of polymer. The membrane should be permeable to $H_2O$, but impermeable to the larger alkali and alkali-earth by-products.

The solution-diffusion model, originally developed by Lonsdale, Merten, and Riley, closely models the transport of water through the water-selective membrane 104. The permeability depends on the diffusivity of water in the water-selective membrane 104, which is closely related to the type of branching chains on the polymer backbone.

The overall chemical reaction in the hydrogen generator 100 can be modeled as a set of independent reactions occurring in series, (i.e. water transport through the water-selective membrane 104 followed by the metal hydride-water reaction). Consequently, the overall reaction rate is determined by the rate-limiting step. It is anticipated that the water transport step is the slowest.

In controlled release applications that are limited by diffusion of a component through a membrane, the rate is typically constant (i.e., zero-order kinetics). For a flat sheet, the reaction rate is given by equation 2 above, with $P=A*D*K$, where A is the area of the membrane, D is the diffusion coefficient, and K is the distribution coefficient (unity for pure water). Tests of certain embodiments provide a diffusion coefficient of about 0.00033 $centimeter^2$/minute.

From equation 2 it is clear that as long is there is water on the outside of the membrane, the transport of water through the membrane will be constant and thus the overall reaction rate will also be constant (i.e., controlled production of hydrogen from a chemical hydride). The reaction rate is substantially instantaneous. Consequently, the rate of diffusion of water through the water-selective membrane 104 is determined by the water concentration gradient across the water-selective membrane 104. A constant reaction rate provides the self-regulating aspect of the present invention.

Referring still to FIG. 1, the hydrogen generator 100 includes a fluid 106 that contacts the water-selective membrane 104. Preferably, the fluid 106 is in a gas state such that the fluid 106 has a minimal impact on the energy density of the hydrogen generator 100 and does not increase the weight of the hydrogen generator 100 significantly. Alternatively, the fluid 106 maybe in a liquid form.

Preferably, the fluid 106 includes a gas mixture of nitrogen, oxygen, water vapor, and/or other gases. Alternatively, the fluid 106 may comprise substantially only water vapor. As the fluid 106 contacts the water-selective membrane 104, the water begins diffusing through the water-selective membrane 104 due to a concentration gradient of water across the membrane that is substantially 100%. Consequently, the water is removed from the fluid 106 and transported to the other side of the water-selective membrane 104. In the embodiment of FIG. 1, the water diffuses into a container formed by the water-selective membrane 104.

As discussed above, the water that passes through the water-selective membrane 104 completely reacts with the chemical hydride 102 to form hydrogen and metallic oxide. The metallic oxide remains within the container. Because the reaction is substantially complete, the concentration gradient remains about 100%. The metallic oxide may collude, but the collusion does not substantially interfere with subsequent reactions between water and the chemical hydride 102.

The water-selective membrane 104 is preferably substantially impermeable to hydrogen, nitrogen, oxygen, and metallic oxides. In certain embodiments, the water-selective membrane 104 may allow hydrogen to pass, however, the concentration gradient across the water-selective membrane 104 may pass water at such a rate as to impede diffusion of hydrogen through the water-selective membrane 104.

Preferably, the hydrogen generator 100 includes an outlet port 108 connected to the water-selective membrane 104 configured to allow hydrogen to exit the water-selective membrane 104. Because the water-selective membrane 104 substantially contains the hydrogen generated by the chemical reaction between the water and the chemical hydride 102, the hydrogen begins to collect within the water-selective membrane 104. The outlet port 108 allows the hydrogen produced by the hydrogen generator 100 to escape.

The outlet port 108 may be simple or complex. In certain embodiments, the outlet port 108 is simply a hole (not shown) in the water-selective membrane 104. In a preferred embodiment, the outlet port 108 is a passage configured to allow a hose or other conduit (not shown) to be detachably connected to the outlet port 108. For example, the outlet port 108 may include threads for engaging a hose. In this manner, hydrogen produced by the hydrogen generator 100 may be collected and transported to a storage tank, fuel cell, or other application that requires pure hydrogen.

Of course the physical relationship of the chemical hydride 102 with respect to the water-selective membrane 104 may vary in different embodiments of the present invention. Those of skill in the art will recognize a variety of configurations for the present invention that permit water to pass through a water-selective membrane 104 and chemically react with a chemical hydride 102. All of these configurations are considered within the scope of the present invention.

Figure 2:
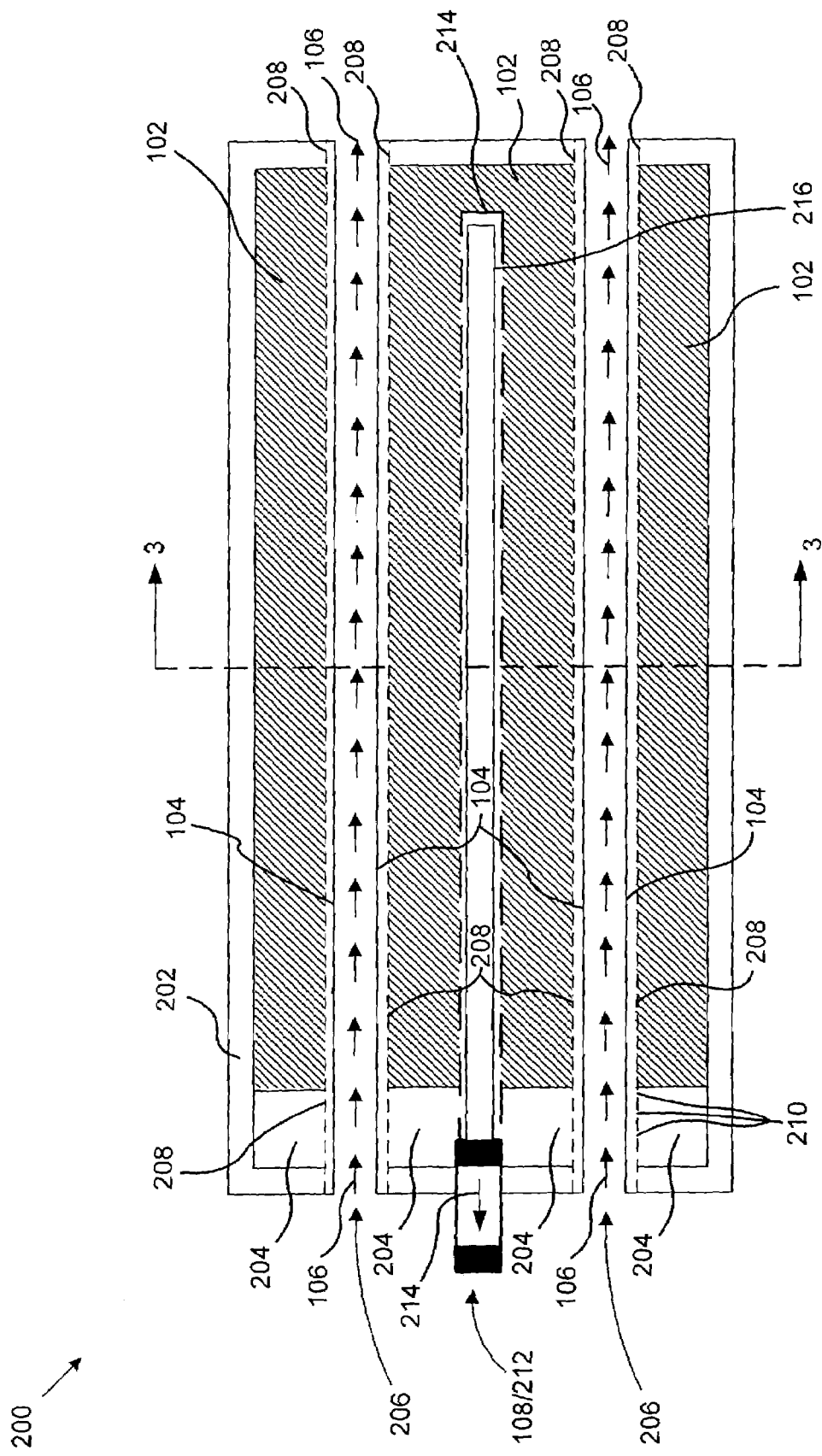
FIG. 2 is a cross-section view illustrating an alternative embodiment of the present invention.

FIG. 2 illustrates a cross-section view of an alternative embodiment of a hydrogen generator 200 according to the present invention, in which chemical hydride 102 is disposed within a housing 202. Preferably, the housing 202 is cylindrical. The housing 202 may, however, have other shapes, including a polygonal or elliptical shape longitudinal cross-section. The housing 202 may comprise a single material such as metal, wood, plastic, or the like. Alternatively, the housing 202 may comprise a combination of materials such as steel, aluminum alloys, polymers, or the like. In a preferred embodiment, the housing 202 is made from copper. Specifically, copper tubing of a suitable diameter may be cap welded to form a suitable housing. Preferably, the material of the housing is thermally conductive to assist in absorbing and dissipating heat produced by the chemical reaction between water and the chemical hydride 102 within the housing 202.

The chemical hydride 102 is disposed within the housing 202. Preferably, a suitable quantity of chemical hydride 102 is sealed within the housing 202 during manufacture of the hydrogen generator 200. Within the housing 202, the quantity of chemical hydride 102 is such that an open space 204 is left in the housing 202. The open space 204 prevents compaction of the chemical hydride within the housing 202 due to expansion of the metallic oxide after chemical reaction with water.

In the depicted embodiment, the housing 202 includes one or more passages 206. Preferably, the passages 206 are straight and extend longitudinally from one end of the housing 202 to the other. The passages 206 may have any suitable diameter smaller than the diameter of the housing 202. In a preferred embodiment, the passages 206 are cylindrical. Alternatively, the passages 206 may have any elliptical or polygonal shaped longitudinal cross-section.

The passages 206 are sized to allow a sufficient quantity of fluid 106 (indicated by the arrows 106) to travel from one end of a passage 206 to the other. In one representative example, the passages 206 may be about 6.5" long and include about a 0.212" diameter. Preferably, the passages 206 each have an equal and consistent diameter along the length of the passage 206. Of course, the diameter of a passage 206 may vary with its length or as compared to other passages 206.

In the depicted embodiment, the passages 206 are lined with a tubular water-selective membrane 104. In certain embodiments, walls of the passages 206 are defined by the water-selective membrane 104. In a preferred embodiment, the passages 206 include support tubes 208 that provide structural support for the water-selective membrane 104. Preferably, the support tubes 208 extend the length of the housing 202 and have a diameter slightly larger than the diameter of the passages 206. The support tubes 208 may be connected to the housing 202 at each end by welding or any other suitable connection.

The support tubes 208 may be made of various materials including metal, ceramic, glass, or the like. Preferably, the support tubes 208 are made from a thermally conductive material such as metal. For example, the support tubes 208 may be made from brass. Thermally conductive support tubes 208 dissipate heat produced by the chemical reaction between the water and chemical hydride 102 within the housing 202 away from the point of the chemical reaction.

The support tubes 208 include perforations 210 that extend the length of the support tube 208. Preferably, the perforations 210 are sized and positioned to allow water to freely move from water-selective membrane 104 to the chemical hydride 102 and to maintain the structural integrity of the support tube 208.

In the depicted embodiment, the passages 206 allow large quantities of fluid 106 to circulate through the hydrogen generator 200. The fluid 106 may originate from a variety of sources. In one representative embodiment, the fluid 106 is a gas mixture by-product of a Proton Exchange Membrane (PEM) fuel cell. The fluid 106 comprises water vapor as well as other gases.

In the depicted embodiment, the fluid 106 enters the passages 206 from the left-hand side and flows toward the right-hand side of the hydrogen generator 200. As the fluid 106 passes through a passage 206, the water vapor contacts the water-selective membrane 104. The water is diffused through the water-selective membrane 104 due to the water concentration gradient and diffusion process discussed above. The water passes through a perforation 210 in the support tube 208 and contacts the chemical hydride 102. The water and chemical hydride 102 react to produce hydrogen and metal oxide.

As mentioned above, the hydrogen produced is prevented from passing through the water-selective membrane 104 by the physical characteristics of the water-selective membrane 104 and the constant water being diffused into the chemical hydride 102. Consequently, the hydrogen begins to build up and pressurize the inside of the housing 202.

As described above, the hydrogen generator 200 includes an outlet port 108 that allows the hydrogen to exit the housing 202 for collection or immediate use. In the depicted embodiment, the outlet port 108 comprises a check valve 212 that allows hydrogen to flow in the direction indicated by the arrow. Preferably, the hydrogen passes through the check valve 212 once sufficient pressure builds up within the housing 202.

Referring still to FIG. 2, the hydrogen generator 200 may include a collection conduit 214 that facilitates collecting and directing the hydrogen out of the housing 202. Preferably, the collection conduit 214 is a rigid, tubular, porous structure. The holes in the collection conduit 214 may be formed during manufacture of the collection conduit 214 or pores that occur naturally in the material comprising the collection conduit 214. The collection conduit 214 may be made from materials such as metal, ceramic, or the like.

The collection conduit 214 is connected to the check valve 212 and extends substantially to the opposite end of the interior of the housing 202. The collection conduit 214 transports hydrogen from within the chemical hydride 102 to the check valve 212.

To prevent blockage, the collection conduit 214 may include a porous filter 216. The filter 216 prevents chemical hydride 102 and metallic oxide from entering the collection conduit and blocking the flow of hydrogen. One representative example of a filter 216 includes a tubular frit made from compressed 2 micron stainless steel particles. The filter 216 may comprise well known structures and materials suitable for allowing passage of hydrogen and blocking chemical hydride 102 and metallic oxide.

Figure 3:
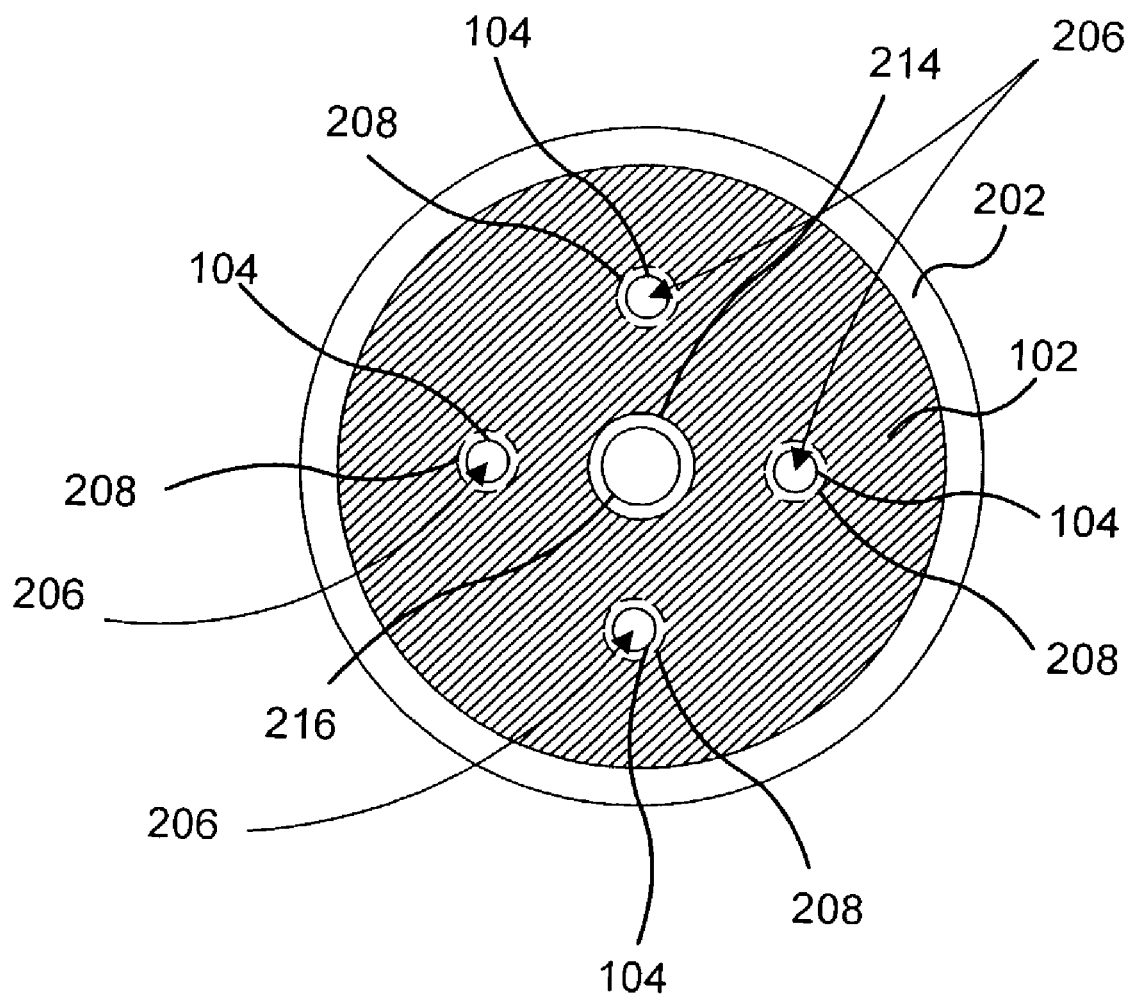
FIG. 3 is a cross-section view taken along lines 3-3 in the embodiment illustrated in FIG. 2.

FIG. 3 illustrates a cross-section view taken along lines 3-3 of the embodiment depicted in FIG. 2. FIG. 3 illustrates that the housing 202 has a circular cross-section. As mentioned above, the housing cross-section may be any suitable shape including a polygon or elliptical shape. The hydrogen generator 200 includes four evenly dispersed passages 206. Of course, the relative position and number of passages 206 may vary in different embodiments.

In the depicted embodiment, a single collection conduit 214 is provided. The collection conduit 214 is centered on the longitudinal axis. Alternatively, a plurality of collection conduits 214 may be positioned within the housing 202.

In a preferred embodiment, the collection conduit 214 has a larger diameter than the passages 206. In order to generate a desired quantity of hydrogen, the surface area of the water-selective membrane 104 is predetermined. Preferably, the diameter of the tubular water-selective membrane 104 is at least 0.025 inches. The number and diameter of the tubular water-selective membranes 104 may be adjusted to achieve the desired water-selective membrane surface area.

Figure 4A:
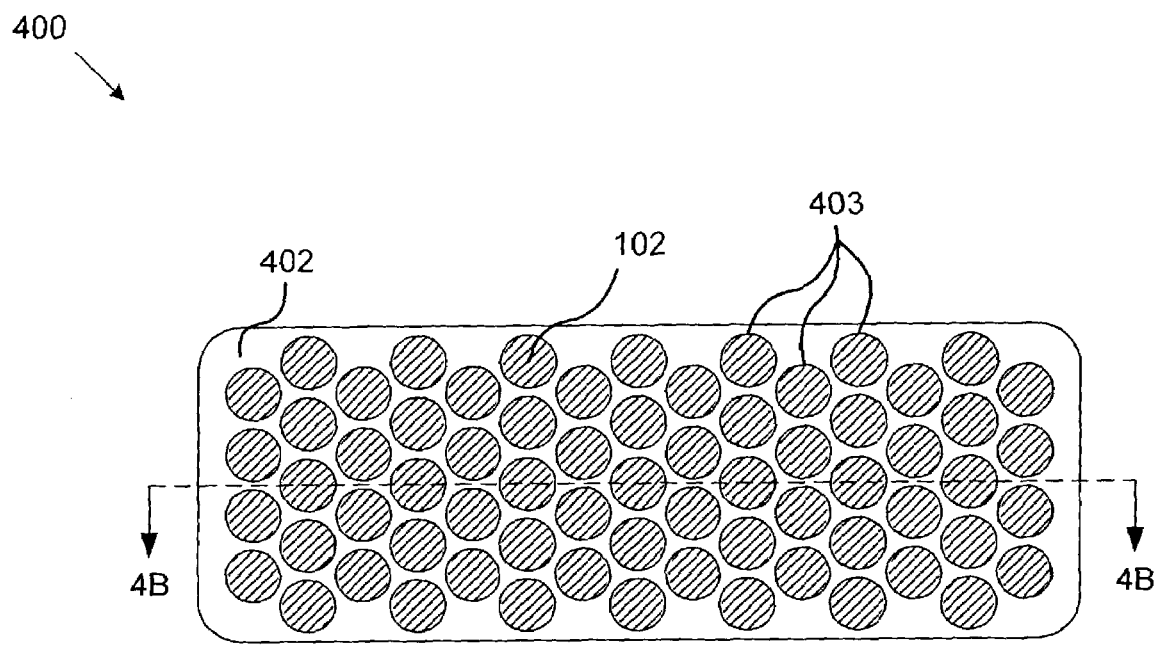
FIG. 4A is a cross-section view illustrating an alternative embodiment of the present invention.

FIG. 4A illustrates a hydrogen generator 400 according to an alternative embodiment of the present invention. As mentioned above, the physical relationship between the fluid 104, water-selective membrane 104, and chemical hydride 102 within the scope of the present invention may be accomplished using a variety of configurations. FIG. 4A illustrates on such alternative configuration.

In FIG. 4A, a planar housing 402 includes a plurality of compartments 403 that house chemical hydride 102. The compartments 403 may be organized in a honeycomb configuration. In the depicted embodiment, the compartments 403 have a circular cross-section. Alternatively, the compartments may have any suitable shape including a polygonal or elliptical cross-section.

Figure 4B:
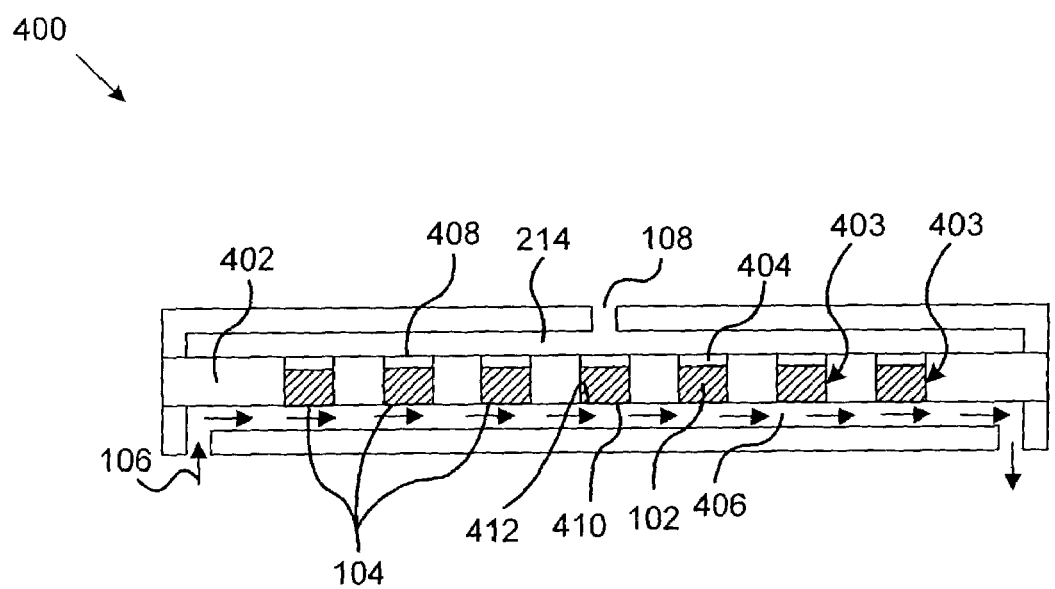
FIG. 4B is a cross-section view taken along lines 4B-4B in the embodiment illustrated in FIG. 4A.

FIG. 4B illustrates a cross-section view of the embodiment of FIG. 4A taken along line 4A-4A. The compartments 403 include an open space 404 that allows the chemical hydride 102 and metal oxide mixture within the compartments 403 to expand as necessary. The housing 402 includes a passage 408 that allows fluid 106 comprising water vapor to flow through the housing 402.

At least one wall of the passage 408 is lined with a water-selective membrane 104 configured in a sheet form. The water-selective membrane 104 is sealed to one end of the compartments 403. The opposite end of each compartment 403 is sealed by a porous material such as a filter 408 configured to retain the chemical hydride 102 and metal oxide mixture within the compartments 403 and allow hydrogen to pass freely out of the compartments 403.

The depicted embodiment functions in a similar manner to that described in relation to FIGS. 1-3. A fluid 106 comprising water vapor enters the passage 406. The fluid 106 contacts an external surface 410 of the water-selective membrane 104. The chemical hydride 102 is in contact with the internal surface 412 of the water-selective membrane 104. Water in the fluid 106 diffuses through the water-selective membrane 104 and reacts with the chemical hydride 102 to produce hydrogen.

Hydrogen in the compartments 403 passes through the filter 408 and enters a collection conduit 214. The hydrogen travels through the collection conduit 214 and exits the housing 402 through the outlet port 108. Of course, the outlet port 108 may also include a check valve (not shown).

Figure 5:
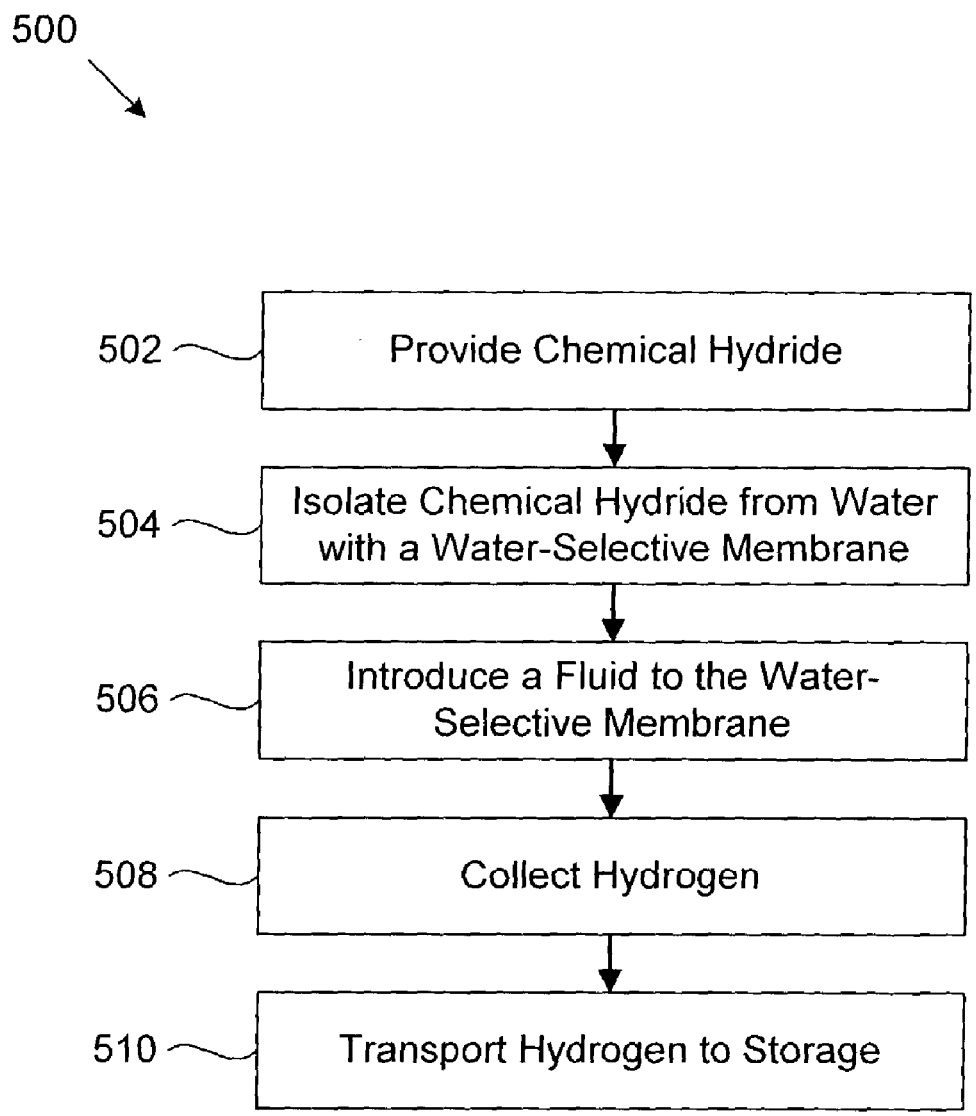
FIG. 5 is a flow chart illustrating a method of the present invention for generating hydrogen by a self-regulated chemical reaction between water and a chemical hydride.

Referring to FIG. 5, a method 500 is illustrated for generating hydrogen through a controlled chemical reaction between water and a chemical hydride. First, a chemical hydride 102 is provided 502. The chemical hydride 102 is isolated 504 from exposure to water by a water-selective membrane 104. Preferably, the chemical hydride 102 is isolated 504 such that water must pass through the water-selective membrane 104 in order to react with the chemical hydride 102. As described above, the chemical hydride 102 may be disposed within a housing 202, 402 that includes a water-selective membrane 104 in fluid communication with the chemical hydride 102. Alternatively, the water-selective membrane 104 may surround the chemical hydride 102.

Next, a fluid 106 comprising water is introduced 506 to the water-selective membrane 104. The fluid 106 may comprise a gas containing water vapor. Alternatively, the fluid 106 is a liquid that includes water. Preferably, the fluid 106 contacts the water-selective membrane 104 and continues to flow such that water is constantly in contact with the external surface of the water-selective membrane 104.

The water-selective membrane 104 selectively diffuses water from the fluid through the water-selective membrane 104. Elements other than water do not substantially diffuse through the water-selective membrane 104. The water reacts with the chemical hydride 102 and generates hydrogen. In certain embodiments, the hydrogen is collected 508 using the outlet port 108 and collection conduit 214. The collection conduit 214 collects hydrogen dispersed within the chemical hydride 102 and transports the hydrogen to the outlet port 108. From the outlet port 108, the hydrogen may be transported to a hydrogen storage device such as a holding tank. Alternatively, the hydrogen may be transported to an engine or fuel cell for immediate use.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hydrogen generator, comprising:
   a chemical hydride disposed within a nonporous water-selective membrane;
   an outlet port connected to the nonporous water-selective membrane and configured to allow hydrogen to exit the nonporous water-selective membrane; and wherein the nonporous water-selective membrane selectively diffuses water from a fluid to the chemical hydride, the fluid comprising a gas that includes water in a gas state, and wherein a rate of diffusion of the water through the water-selective membrane is determined by a water concentration gradient across the water-selective membrane.

2. The hydrogen generator of claim 1, wherein the nonporous water-selective membrane is substantially impermeable to hydrogen, nitrogen, oxygen, and metallic oxides.

3. The hydrogen generator of claim 1, wherein the outlet port comprises a filter configured to retain chemical hydride within the nonporous water-selective membrane.

4. The hydrogen generator of claim 1, wherein the outlet port comprises a check valve configured to prevent fluid from flowing into the nonporous water-selective membrane.

5. The hydrogen generator of claim 1, further comprising a collection conduit connected to the outlet port configured to transport hydrogen from the outlet port.

6. The hydrogen generator of claim 1, wherein the nonporous water-selective membrane is formed of a unitary polymer-based material.

7. The hydrogen generator of claim 1, wherein the nonporous water-selective membrane is formed of Nafion.

8. A hydrogen generator, comprising:
a chemical hydride disposed within a housing;
a check valve connected to the housing and configured to allow hydrogen to exit the housing;
a water-selective membrane configured to separate a fluid comprising water from the chemical hydride, the water-selective membrane selectively diffusing water from the fluid into the chemical hydride to react with the chemical hydride, the fluid comprising a gas that includes water in a gas state;

wherein a rate of diffusion of the water through the water-selective membrane is determined by a water concentration gradient across the water-selective membrane; and passages formed in the housing that extend longitudinally from one end of the housing to the other, the passages configured to receive an input stream of fluid and having support tubes that support the water-selective membrane.

9. The hydrogen generator of claim 8, wherein the water-selective membrane is tubular and the support tubes are perforated and connected to the water-selective membrane.

10. The hydrogen generator of claim 8, further comprising a filter connected to the check valve to retain chemical hydride within the housing.

11. The hydrogen generator of claim 8, wherein the water-selective membrane is tubular with a cross-section diameter of at least 0.025 inches.

12. The hydrogen generator of claim 8, further comprising a collection conduit connected to the check valve configured to transport hydrogen inside the housing to the check valve.

13. The hydrogen generator of claim 8, wherein a PEM fuel cell is connected to said hydrogen generator and said fluid comprising water originates from a gas mixture by-product of said PEM fuel cell.

14. The hydrogen generator of claim 8, wherein the water-selective membrane is formed of a unitary nonporous polymer-based material.

15. The hydrogen generator of claim 8, wherein the water-selective membrane is formed of Nafion.

* * * * *